United States Patent
Asi et al.

(10) Patent No.: US 12,299,081 B1
(45) Date of Patent: May 13, 2025

(54) LONG DOCUMENT TOPIC SUMMARIZATION USING LARGE LANGUAGE MODELS

(71) Applicant: MICROSOFT TECHNOLOGY LICENSING, LLC., Redmond, WA (US)

(72) Inventors: Abedelkader Asi, Sammamish, WA (US); Roy Eisenstadt, Tel-Aviv (IL); Rotem Rina Preizler, Kiryat-Ono (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/593,945

(22) Filed: Mar. 3, 2024

(51) Int. Cl.
*G06F 16/00* (2019.01)
*G06F 16/93* (2019.01)
*G06F 18/2415* (2023.01)

(52) U.S. Cl.
CPC .......... *G06F 18/2415* (2023.01); *G06F 16/93* (2019.01)

(58) Field of Classification Search
None
See application file for complete search history.

(56) References Cited

U.S. PATENT DOCUMENTS

| | | | |
|---|---|---|---|
| 10,198,436 | B1 | 2/2019 | Dockhorn |
| 10,685,050 | B2 | 6/2020 | Krishna |
| 11,119,624 | B2 | 9/2021 | Johnson |
| 2023/0237399 | A1* | 7/2023 | Hoang ........... G06N 3/045 704/9 |

FOREIGN PATENT DOCUMENTS

CA 2943513 C * 8/2020 ....... G06F 16/24522

OTHER PUBLICATIONS

Barrios, et al., "Variations of the Similarity Function of TextRank for Automated Summarization", arXiv:1602.03606v1, Feb. 11, 2016, 8 pages.
Beltagy, et al., "Longformer: The Long-Document Transformer", arXiv:2004.05150v2, Dec. 2, 2020, 17 pages.
Blei, et al., "Latent Dirichlet Allocation", Journal of Machine Learning Research, vol. 3, 2003, pp. 993-1022.
Brown, et al., "Language Models are Few-Shot Learners", Advances in neural information processing systems, vol. 33, 2020, 25 pages.

(Continued)

*Primary Examiner* — Tuankhanh D Phan

(57) ABSTRACT

A large language model predicts a topic summarization of a long document given a set of segments from the long document that pertain to a topic of interest. The set of segments from the long document are selected by searching for similar segments from other documents that have been labeled to indicate whether or not the segment pertains to a topic of interest. The search is based on an embedding of a segment from the long document closely matching embeddings of the labeled segments. Each segment of the long document is scored based on the labels of the closest-matching similar segments. The segments from the long document are ranked by their respective score and the highest-scored segments are included in a prompt to the large language model for the model to generate a topic summarization of the long document.

20 Claims, 7 Drawing Sheets

(56) References Cited

OTHER PUBLICATIONS

Cheng, et al., "Neural Summarization by Extracting Sentences and Words", In Proceedings of the 54th Annual Meeting of the Association for Computational Linguistics, vol. 1, 2016, pp. 484-494.
Devlin, et al., "BERT: Pre-training of Deep Bidirectional Transformers for Language Understanding", arXiv:1810.04805v2, May 24, 2019, 16 pages.
Dong, et al., "Unified Language Model Pre-training for Natural Language Understanding and Generation", 33rd Conference on Neural Information Processing Systems, 2019, 13 pages.
Duhan, et al., "Page Ranking Algorithms: A Survey", In International Advance Computing Conference, IEEE, 2009, 8 pages.
Erkan, et al., "LexRank: Graph-based Lexical Centrality as Salience in Text Summarization", Journal of artificial intelligence research, vol. 22, 2004, pp. 457-479.
Ester, et al., "A densitybased algorithm for discovering clusters in large spatial databases with noise", In kdd, vol. 96, 1996, pp. 226-231.
Ginzburg, et al., "Self-Supervised Document Similarity Ranking via Contextualized Language Models and Hierarchical Inference", Findings of the Association for Computational Linguistics, 2021, pp. 3088-3098.
Issam, et al., "Topic Modeling Based Extractive Text Summarization", accessed on link https://arxiv.org/ftp/arxiv/papers/2106/2106.15313.pdf, Jun. 29, 2021, 10 pages.
Ji, et al., "Survey of Hallucination in Natural Language Generation", ACM Computer Survey, vol. 1, Issue No. 1, 2022, 60 pages.
Kondath, et al., "Extractive summarization of Malayalam documents using latent Dirichlet allocation: An experience", Journal of Intelligent Systems, vol. 31, 2022, pp. 393-406.
Lewis, et al., "BART: Denoising Sequence-to-Sequence Pre-training for Natural Language Generation, Translation, and Comprehension", In Proceedings of the 58th Annual Meeting of the Association for Computational Linguistics, 2020, pp. 7871-7880.
Liu, Yang., "Fine-tune BERT for Extractive Summarization", arXiv:1903.10318v2, Sep. 5, 2019, 6 pages.
Malkiel, et al., "GPT-CALLS: Enhancing Call Segmentation and Tagging by Generating Synthetic Conversations via Large Language Models", arXiv:2306.07941v1, Jun. 9, 2023, 8 pages.
Mihalcea, et al., "TextRank: Bringing Order into Texts", In Proceedings of the Conference on Empirical Methods in Natural Language Processing, Association for Computational Linguistics, 2004, pp. 404-411.
Nallapati, et al., "Abstractive Text Summarization using Sequence-to-sequence RNNs and Beyond", In Proceedings of the 20th SIGNLL Conference on Computational Natural Language Learning, Association for Computational Linguistics, 2016, pp. 280-290.
Nallapati, et al., "SummaRuNNer: A Recurrent Neural Network Based Sequence Model for Extractive Summarization of Documents", In Proceedings of the Thirty-First AAAI Conference on Artificial Intelligence, 2017, pp. 3075-3081.
Narayan, et al., "Ranking Sentences for Extractive Summarization with Reinforcement Learning", In Proceedings of the Conference of the North American Chapter of the Association for Computational Linguistics: Human Language Technologies, vol. 1, 2018, pp. 1747-1759.
Nenkova, et al., "Automatic Summarization", Foundations and Trends in Information Retrieval, vol. 5, 2011, 133 pages.
Reimers, et al., "Sentence-BERT: Sentence Embeddings using Siamese BERT-Networks", arXiv:1908.10084v1, Aug. 27, 2019, 11 pages.
Roitman, et al., "Unsupervised Dual-Cascade Learning with Pseudo-Feedback Distillation for Query-Focused Extractive Summarization", In Proceedings of The Web Conference, Association for Computing Machinery, 2020, pp. 2577-2584.
See, et al., "Get To The Point: Summarization with Pointer-Generator Networks", In Proceedings of the 55th Annual Meeting of the Association for Computational Linguistics, 2017, pp. 1073-1083.
Shi, et al., "Study of TFIDF algorithm", Journal of Computer Applications, vol. 6, 2009, pp. 167-170.
Vanetik, et al., "Query-based summarization using MDL principle", In Proceedings of the MultiLing 2017 Workshop on Summarization and Summary Evaluation Across Source Types and Genres, Apr. 3, 2017, pp. 22-31.
Vaswami, et al., "Attention Is All You Need", In 31st Conference on Neural Information Processing Systems, vol. 30, 2017, 11 pages.
Wan, Xiaojun., "Using only cross-document relationships for both generic and topic-focused multi-document summarizations", Springer, 2008, pp. 25-49.
Wang, et al., "Graph-based Dependency Parsing with Bidirectional LSTM", In Proceedings of the 54th Annual Meeting of the Association for Computational Linguistics, 2016, pp. 2306-2315.
Xiao, et al., "Extractive Summarization of Long Documents by Combining Global and Local Context", In Proceedings of the Conference on Empirical Methods in Natural Language Processing and the 9th International Joint Conference on Natural Language Processing, 2019, pp. 3011-3021.
Zheng, et al., "Sentence Centrality Revisited for Unsupervised Summarization", In Proceedings of the 57th Annual Meeting of the Association for Computational Linguistics, 2019, pp. 6236-6247.

\* cited by examiner

PROMPT FOR TOPIC SUMMARIZATION 500

INSTRUCTIONS 502

<system message>
You are an assistant that helps users to gather important details from a long document. The document is a Request For Proposal (RFP) that solicits potential bidders. The document was issued by a procuring entity (issuer) who is interested in getting a commodity, service, or valueable asset. The user is a potential bidder who wants to respond to the RFP by submitting a proposal.

The most important details are the answers to the following questions:
 1. Issuer's identity - Who is the procuring entity? who created the RFP?
 2. Issuer's description - What is the procuring entity? What is the scope of the procuring entity?
 3. Procured items (overview) - What is the requested service/project/product? Provide a high-level summary, focusing on the main points or themes.
 4. Procured items (In-depth) - what is the scope of the requested service/project/product? Delve slightly deeper, offer more context and relevant details.
 5. Procured items (Comprehensive) - What are the details of the required service/project? Provide a thorough and detailed summary, covering all aspects of the content.
 6. Deadlines and timelines - When the proposal is due (submittal deadline)? What other important dates are mentioned? Include only accurate dates in the answer
 7. Contact details - How should the proposal be submitted? If there is a contact person, what are the contact details?
 8. Budget - What is the budget limit for the project/service/product?
 9. Additional important details - What other important details are in the text (that were not related to the above questions)?

The answers to these questions should be accurate and concise. The summary should be outputted in the format of a json file bringing the answers to the above questions into the following schema:

Important Details:{
    customer_identity: <Issuer's identity answer>,
    customer_description: <Issuer's description answer>,
    customer_need: <Procured items (overview) answer>,
    customer_need_scope: <Procured items (In-depth) answer>,
    customer_need_description: <Procured items (Comprehensive) answer>,
    deadlines_and_timelines: <Deadlines and timelines answer>,
    contact_details: <Contact details answer>,
    budget: <Budget answer>,
    additional_details: <Additional important details answer>}

The user will first paste the segments from the document they would like you to summarize. Think very carefully step-by-step when processing the document text. The output must be in the json format described above.
</system message>

SEGMENT DATA 504

<user message>
 segment 1, ... , segment n
</user message>

*FIG. 5*

LONG DOCUMENT TOPIC SUMMARIZATION USING LARGE LANGUAGE MODELS

BACKGROUND

Large language models (LLMs) are used to solve a variety of natural language problems that involve analyzing sequential data to detect patterns that can be used to make predictions. Large language models are given an input sequence containing features of the data for which the model makes a prediction. The input sequence is limited to the size of a context window that the model uses to generate a response. The context window size is often constrained to a number of tokens that the model can process at one time. For example, the Generative Pre-Trained Transformer, GPT-4, model from OpenAI, has a context window of 8K tokens. However, for long documents that contain more than 8K tokens, the limitation on the size of the context window affects the accuracy of the results produced by the model.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A large language model predicts a topic summarization of a long document given select segments from the long document that pertain to a topic of interest. The segments from the long document are selected by searching for similar segments from other documents that have been labeled to indicate whether or not the segment pertains to a topic of interest. The search is based on an embedding of a segment from the long document closely matching embeddings of the labeled segments. Each segment of the long document is scored based on the labels of the closest-matching similar segments. The segments from the long document are ranked by their respective score and the highest-scored segments are included in a prompt to the large language model for the model to generate a topic summarization of the long document.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 5 is an exemplary prompt for the large language model to generate the topic summarization.

DETAILED DESCRIPTION

Overview

Figure 1:
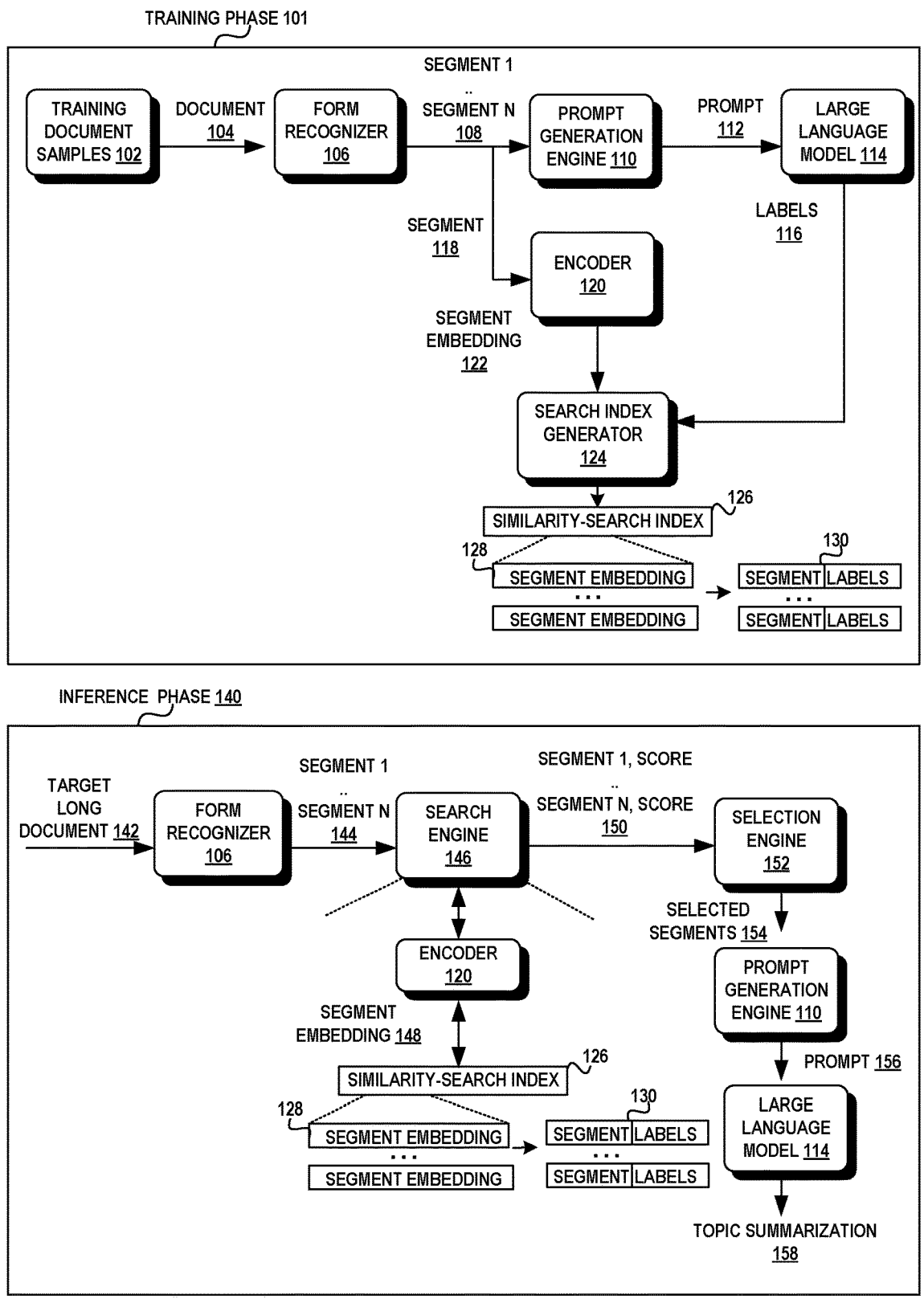
FIG. 1 is a schematic diagram illustrating an exemplary system for generating a similarity-search index of segment embeddings and for generating a topic summarization of a long document.

Aspects of the present disclosure pertain to the automation of a topic summarization of a long document using a large language model. The large language model predicts a topic summarization of the long document given select segments from the long document that contain data pertaining to the main topics of interest. The topics of interest are pre-selected by a user or pre-configured based on the type of document being summarized.

The long document is partitioned into segments and each segment is associated with a score that indicates how well the data of the segment pertains to a topic of interest. A topic of interest is a subject represented in the contents of the long document. The score for a segment is based on labels of semantically-similar segments where a label indicates whether or not the semantically-similar segment pertains to a topic of interest. In an aspect, there are several topics of interest and each semantically-similar segment is associated with each label. A label contains a true or false Boolean value which indicates whether or not the semantically-similar segment pertains to a particular topic of interest. The segments are ranked by a respective score and the highest-scored segments are included in the prompt to the large language model to generate the topic summarization of the long document.

A long document is a natural language text file that has a structure where different parts of the text file have different characteristics and roles. The structure of a long document may contain titles, paragraphs, tables, and bulleted items that each have a specific function. The long document contains tens of pages and the text itself can exceed the maximum token limit of the context window of the large language model. Examples of a long documents include a Request For Proposal (RFP), contracts, manuals, proposals, technical specifications, etc.

The score for a segment is based on the labels associated with the k-closest semantically-similar segments. The k-closest semantically-similar segments are found using a similarity-search index constructed from samples having been labeled. There is a similarity-search index for each type of document. For example, there is a similarity-search index for text segments of supply chain legal contracts, another similarity-search index for request for proposals (RFP), and another similarity-search index for request for quotes (RFQ).

The search for the k-closest semantically-similar segments is based on an embedding of the segment of the long document and the embeddings of the similar segments. Each segment of the long document is represented by an embedding that represents the meaning or semantics of the segment. Segments having similar embeddings are deemed to have the same meaning even if different words are used in a similar segment. The similarity-search index groups embeddings of semantically-similar segments in close proximity so that searches are performed quickly.

Attention now turns to a more detailed description of the components, methods, processes, and system for automating summarization of a long document.

System

FIG. 1 illustrates a block diagram of an exemplary document topic summarization system 100 having a training phase 101 and an inference phase 140. In the training phase 101, the similarity-search index 126 is generated. The training phase 101 occurs offline before the inference phase 140 starts up. In the inference phase 140, the topic summarization 158 is generated for a target long document 142.

In the training phase 101, a similarity-search index 126 is generated for a particular type of long document, such as rental lease, supply chain contract, RFP, sales order, etc. Training document samples 102 are obtained that pertain to the particular type of document from various sources. Each document 104 is partitioned into segments, (segment 1 . . . segment n) 108 by a form recognizer 106.

The form recognizer 106 receives the input file of a long document, which can be either a word file (.docx file) or a Portable Document Format (PDF) file (.pdf file). The form recognizer 106 extracts the text from the file and outputs the text content in the form of separated segments of text, as opposed to one long continuous piece of text. The method in which the form recognizer separates the text into different segments depends on the file type because the information is encoded differently for different file types. The word documents encode the text in an already separated manner since it is encoded into different pieces that were defined in the original process of creating the file. For example, different fonts, sizes, line breaks, tables, and all of the text contents are stored in the file accordingly in a separated manner. Hence, the extraction of text segments from a word file relies on the encoding of the text in the file, and is a straightforward procedure that is done with many a coding tool that can read or decode word files.

The form recognizer 106 for a general PDF document relies on Optical Character Recognition (OCR). The processing is done on each of the pages and includes multiple steps as follows: (1) detection of parts in the page that include text (usually referred to as "rectangles"); (2) for each detected part (rectangle) there is a line detection; and (3) characters (letters) recognition. The whole processing yields text segments separated according to the geometrical characteristic of the layout in the page (i.e., the "rectangles" from step (1)). Examples of form recognizers include Azure AI Document Intelligence, Microsoft's Form Recognizer, and OCR-based tools designed for PDFs (e.g., nanonets).

A prompt generation engine 110 generates a prompt 112 to a large language model 114 for the large language model 114 to predict a label for each segment of the training document sample 102. The prompt 112 contains instructions and the segment extracted from the document 104 that needs a label. The instructions inform the large language model about the topics of interest and instruct the large language model to label the segments based on whether the data of a segment pertains to a particular topic of interest. There may be several prompts based on the number of segments extracted from the document 104. The instructions inform the large language model 114 of the task the large language model is to perform which is to predict a label 116 for each topic for the segment contained in the prompt. The large language model 114 returns a response containing the labels 116 for each topic for each segment in the document 104.

The prompt 112 is the input to the large language model 114. The natural language text of the prompt 112 is transformed into tokens. A token is a smaller portion of the text of a segment and can represent a word, a character, or sequence of characters. Each token is replaced with a corresponding embedding and the sequence of token embeddings representing the natural language text of the prompt has to fit within the size of the context window of the large language model 114.

An encoder 120 generates an embedding for each segment 118. The embedding of a segment 122 is a numeric vector representation of the segment. The embedding is generated by an encoder 120, such as Word2Vec, Bidirectional Encoder Representations from Transformers (BERT), and the like.

The search index generator 124 creates a similarity-search index 126 that is used to search for the segment embeddings 128 closest to a query embedding using an approximate nearest neighbor search. The aim of the similarity-search index 126 is to search a subset of segment embeddings instead of performing a brute force search on all of the segment embeddings. In an aspect, the search index generator 124 creates the similarity-search index 126 at once when all the segment embeddings and associated labels from the training document samples are generated.

The similarity-search index 126 is based on inverted indices that store sets of segment embeddings that are within a close proximity to each other into a cluster. Each cluster contains a centroid. The segment embeddings of each cluster are stored into an inverted list. At search time, the clusters having a centroid closest to a query are searched. Each segment embedding is associated with a set of labels. The labels and the segments are stored in a separate table 130 and indexed by the associated segment embedding.

In an aspect, the large language model 114 is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention. In an aspect, the large language model is configured as an encoder-decoder neural transformer model with attention having a series of stacked encoder blocks coupled to a series of stacked decoder blocks. In another aspect, the large language model consists only of stacked decoder blocks. In addition, the large language model may be trained to perform different tasks and/or may be configured in different model sizes (i.e., different number of parameters).

In an aspect, the large language model is pre-trained on natural language text. The training of a large language model requires a considerable amount of training data and computing resources which makes it impossible for some developers to create their own models. The large language model consists of billions of parameters (e.g., weights, biases, embeddings) from being trained on terabytes of data. Examples of the large language models include the pre-trained generative neural transformer models with attention offered by OpenAI i.e., ChatGPT and Codex models, PaLM and Chinchilla by Google, and LLaMa by Meta.

In the inference phase 140, a user may submit a request for a topic summarization of a target long document 142. The form recognizer 106 extracts segments, segment 1 . . . segment n, 144 from the target long document 142. For each segment, a search engine 146 uses the encoder 120 to generate an embedding for each segment in the target document 142. The search engine 146 uses the similarity-search index 126 to find the k nearest neighbors to each segment embedding of the target document. In an aspect, an approximate nearest neighbor search is used. The approximate nearest neighbor search produces an approximation of the nearest neighbors rather than an accurate result where the approximation is within a predetermined tolerance. The approximate nearest neighbor search starts on a small candidate set of embeddings rather than searching each stored segment embedding.

The search engine 146 performs the search operation on the similarity-search index 126 to find the centroids of the clusters closest to a query embedding. Thereafter, the search engine 146 finds the k nearest neighbors to a particular segment embedding of the target document as follows:

$$(n_1, \ldots, n_k) = k\text{-argmin}_{n=1 \ldots N} \|q - x_n\|,$$

given a cluster of segment embedding vectors ($x_i$, i=1 . . . N), a query embedding q, an integer value indicating the number of the nearest neighbors k, where the distance measure $\|q-x_n\|$ may be an L2 distance or cosine similarity. The L2 distance is the Euclidean distance between the segment embedding in a cluster and the query embedding. The cosine similarity is the cosine of the angle between the segment embedding of the cluster and the query embedding which is computed as the dot product of the two segment embedding vectors divided by the product of their lengths.

The search engine 146 generates a score 150 for each segment. The selection engine 152 selects the segments having the highest scores 154 that fit within the context window size of the large language model 114. The prompt generation engine 110 creates a prompt 156 to the large language model 114 that includes instructions and the highest-scored segments that fit within the context window size. The large language model 114 processes the data in the prompt to generate a topic summarization 158 of the target long document 142.

Methods

Attention now turns to a more detailed description of the methods used in the system for code review generation. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
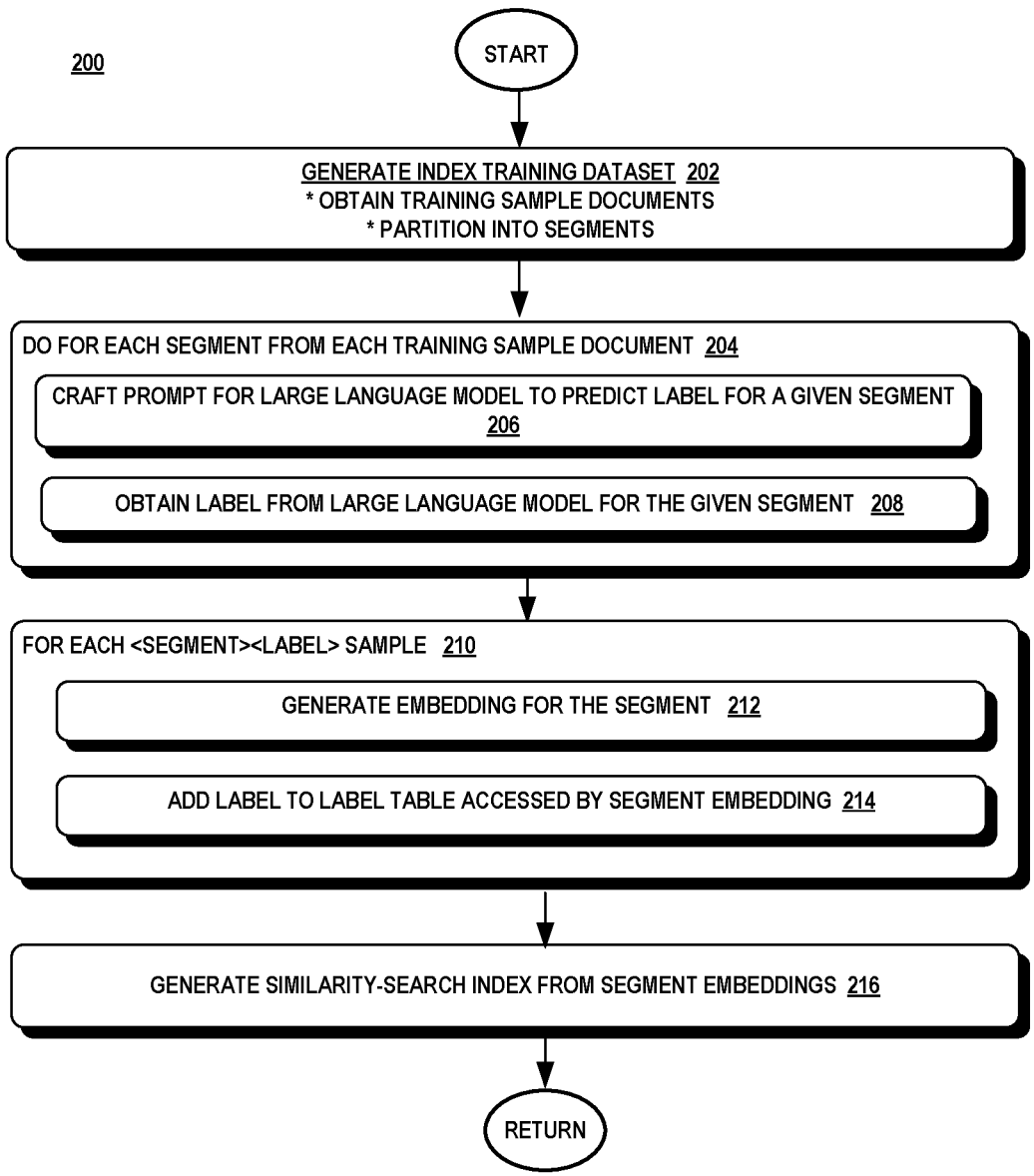
FIG. 2 is a flow diagram illustrating an exemplary method for generating the similarity-search index.

Turning to FIG. 2, there is shown an exemplary method for generating the similarity-search index 200. The similarity-search index is generated for a particular type of document. The training document samples come from the same type of document and are obtained from various sources. In some aspects, the similarity-search index is customized for a particular customer, user, or client and contains training samples specific to the type of document from the particular customer, user or client. In other aspects, the similarity-index is generated from publicly-accessible data from the Internet and other public sources. The training sample documents are obtained and the segments are extracted from each training sample document. (Collectively, block 202).

For each segment of each training sample document (block 204), a prompt is generated to a large language model to predict a label for the segment (block 206). Alternatively, the prompt may include several segments that fit within the context window size (block 206). The large language model responds with a label for each segment listed in the prompt (block 208).

The prompt to the large language model may be issued using an Application Programming Interface (API). In an aspect, a remote server hosts the large language model and a computing device hosts the prompt generation engine. The prompt generation engine and the remote server communicate through HTTP-based Representational State Transfer (REST) APIs. A REST API or web API is an API that conforms to the REST protocol. In the REST protocol, the remote server hosting the large language model contains a publicly-exposed endpoint having a defined request and response structure. The prompt generation engine issues web APIs containing the prompt to the remote server to instruct the large language model to perform the intended task. The prompt generation engine receives the response from the large language model as well.

Next, for each segment and associated label (block 210), the encoder generates an embedding of the segment (block 212). The segment and the label associated with the segment embedding is stored in a table and accessed by a mapping based on the corresponding segment embedding (block 214)

Once all the segment embeddings and associated labels are obtained from the training sample documents, the similarity-search index is created (block 216). The segment embeddings are grouped into clusters where each cluster contains closely-similar segment embeddings. A centroid for each cluster is computed as an arithmetic mean of the segment embeddings in the cluster. The index contains the centroids of each cluster and the associated segment embeddings of each cluster.

Figure 3:
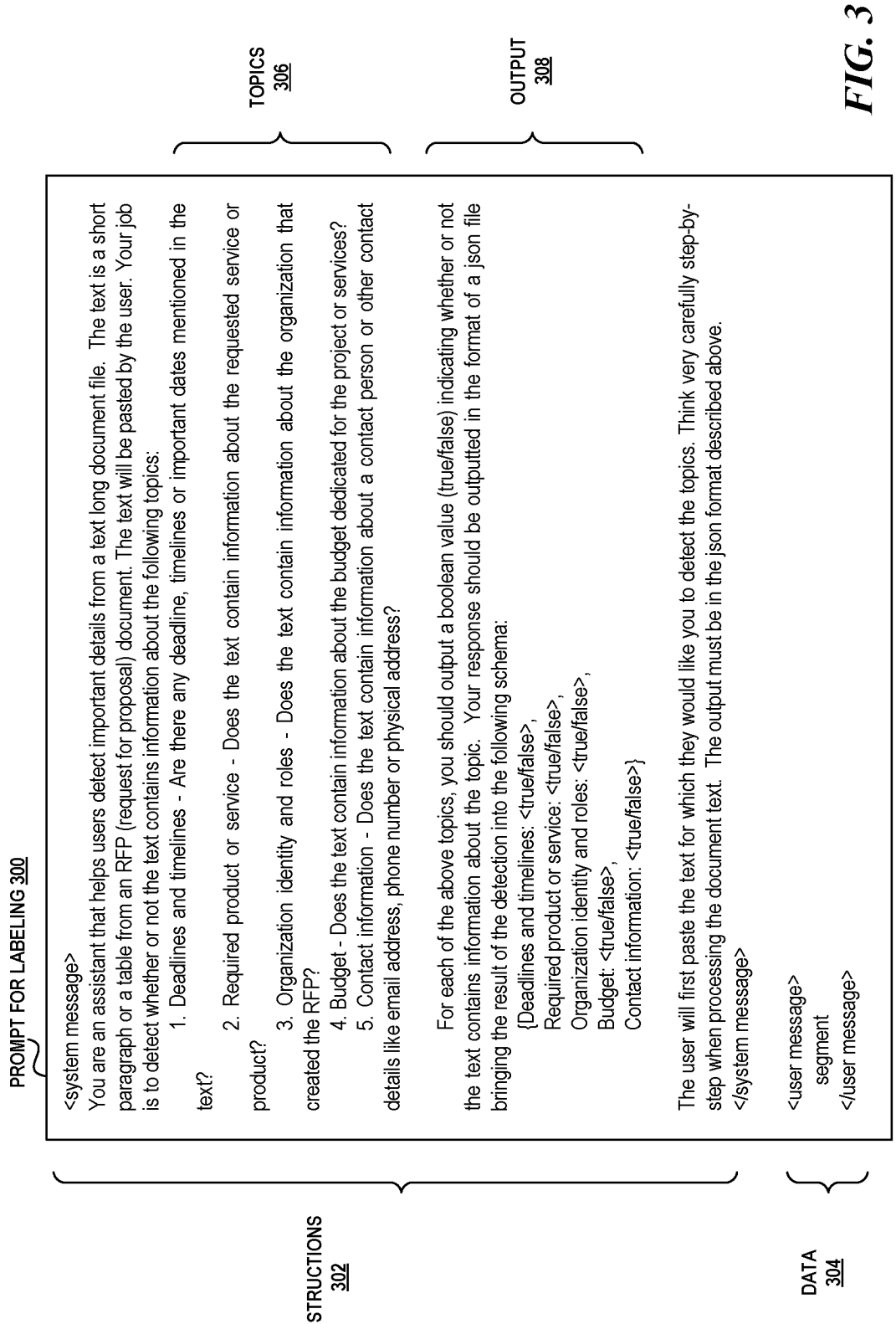
FIG. 3 is an exemplary prompt to a large language model for the large language model to predict whether or not a segment of the long document contains data associated with a topic of interest.

Turning to FIG. 3, there is shown an exemplary prompt 300 for the large language model to predict a label for a segment of a long document. The prompt 300 includes instructions 302 (<system message> . . . </system message>) and the data or segment 304 requiring a label (<user message> . . . </user message>). The instructions include the topics of interest 306 which include deadlines and timelines, the required product or service, the organization identity and roles, the budget, and the contact information. The instructions include the format of the response which includes a JavaScript Object Notation (JSON) file with a particular schema 308.

Figure 4:
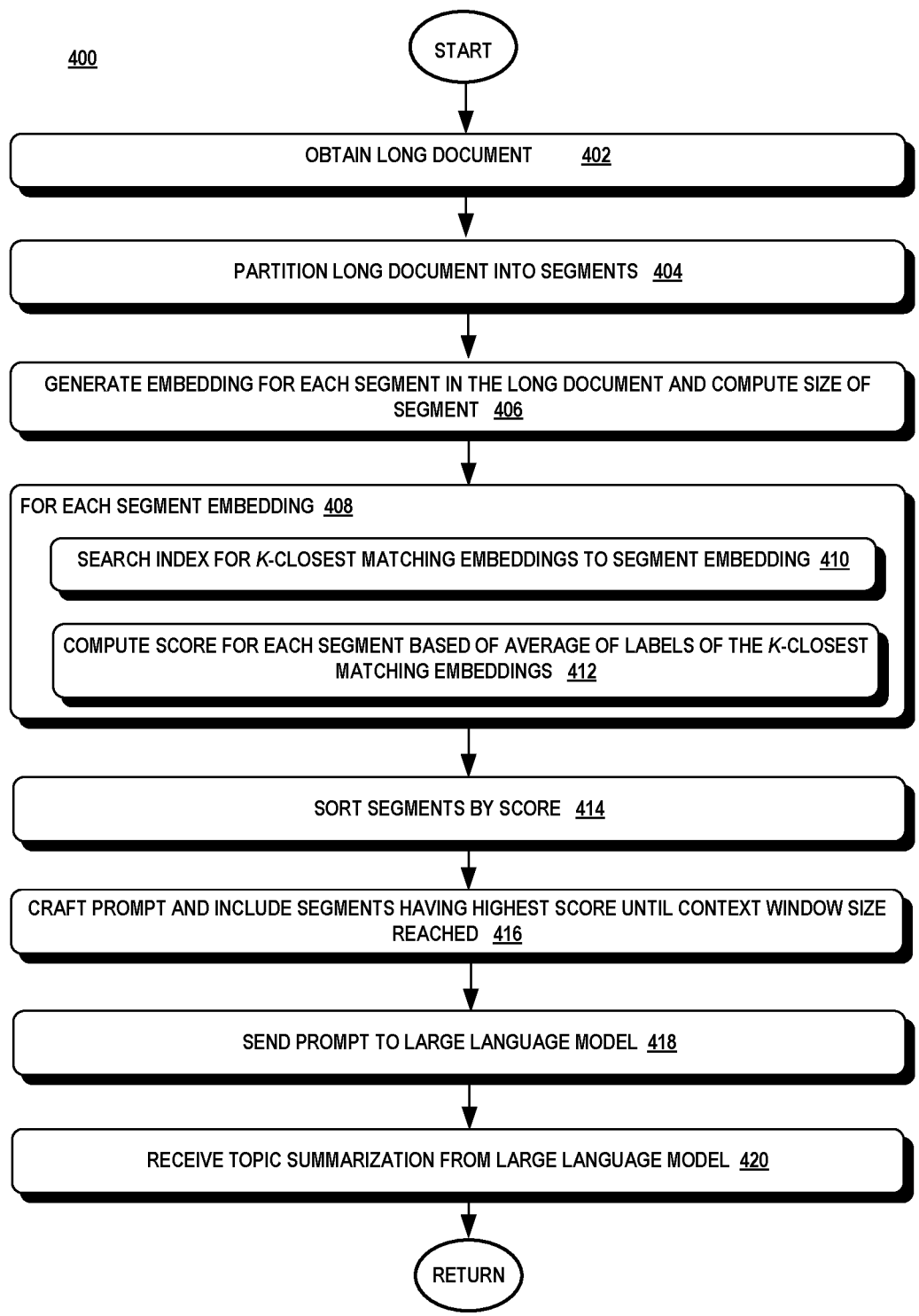
FIG. 4 is a flow diagram illustrating an exemplary method for generating the topic summarization for a long document.

Turning to FIG. 4, there is shown an exemplary method 400 for generating a summarization of a long document. Initially, a long document is obtained (block 402). The long document is then partitioned into segments by a form recognizer (block 404). Each segment is encoded into an embedding and its size is computed (block 406).

For each segment embedding (block 408), a search is made for the k-closest matching segment embeddings from the similarity-search index, where k is a pre-defined integer (block 410). The search for the k-closest matching segment embeddings uses a k-approximate nearest neighbor search to find the k-closest-matching segment embeddings (block 410).

For each segment embedding, a score is computed based on the labels of the k-closest matching segment embeddings (block 412). The label consists of a Boolean value which is either 1 or 0 and used as an integer value. The score is the average of the labels from each of the k-closest matching segment embeddings. For example, in the case where k=5 and the labels of the k-closest matching segment embeddings include 1, 0, 1, 0, 0, then the score for the segment is 2/5 or 0.4. The score for any segment embedding for the case where k=5 will consist of a value that is one of 0, 0.2, 0.4, 0.6, 0.8, or 1 (block 412).

Each of the segments are sorted by their respective score (block 414). The prompt generation engine crafts a prompt to a large language model which includes the instructions to the large language model and the segments from the documents starting from the highest-scored segments until the size of the prompt reaches the maximum context window size (block 416). The prompt generation engine maintains a count of the number of tokens in the prompt which includes the tokens of the instructions and the tokens of each selected segment (block 416). The prompt is then transmitted to the large language model (418) and the large language model returns the topic summarization (block 420).

FIG. 5 illustrates an exemplary prompt for the large language model to generate the topic summarization given the selected segments of a long document. The prompt 500 includes instructions 502 and the selected segments 504. In the example shown in FIG. 5, the prompt is for the large language model to generate a topic summarization for an RFP document for specific topics of interest and in a particular output format. The instructions 502 list nine topics of interest that need to be summarized from a long document. The topics of interest include the issuer's identity, the issuer's description, an overview of the procured items, an in-depth description of the procured items, a comprehensive description of the procured items, deadlines and timelines, contract details, budget, and additional important details.

The instructions 502 include an output format that contains a schema having the following tags: customer_identity, customer_description, customer_need, customer_need_scope, customer_need_description, deadlines_and_timelines, contact_details, budget, and additional_details that pertain to the nine topics of interest.

Operating Environments

Figure 6:
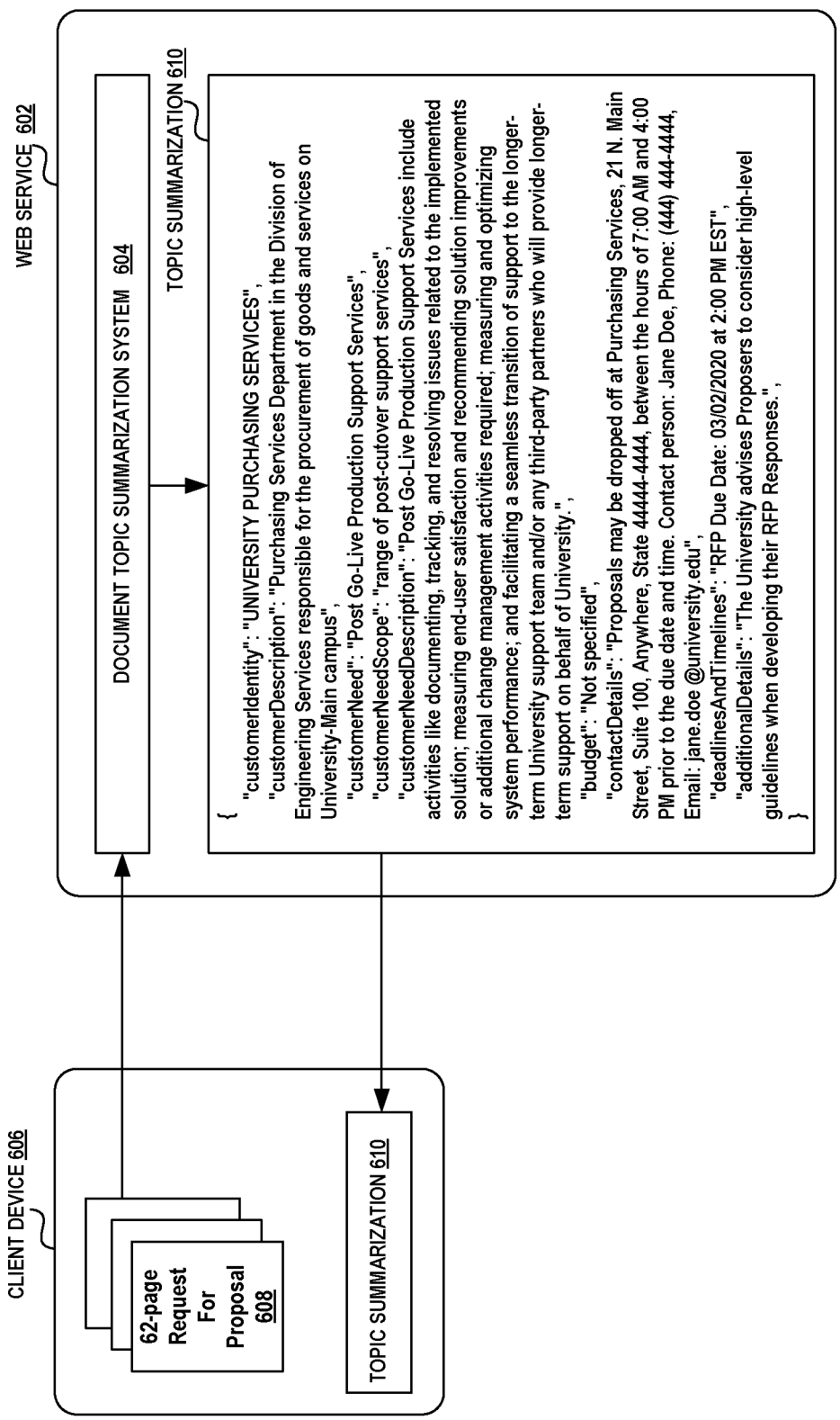
FIG. 6 is an exemplary web service hosting a document topic summarization system that provides a topic summarization for a Request For Proposal (RFP) document.

Attention now turns to a description of an exemplary application 600 employing the document topic summarization system. Turning to FIG. 6, there is shown a web service 602 hosting the document topic summarization system 604. The web service 602 is accessed through a network, such as the Internet. The web service 602 may be part of a Customer Relationship Management (CRM) application which manages interactions between existing and prospective customers of a company during a sales process.

A request is made, from a client device 606, for the web service 602 to provide a topic summarization of a 62-page Request For Proposal (RFP) 608. The RFP is the long document that the document topic summarization system 604 partitions into segments and assigns a score to each segment based on the importance of similar segments as described above. The document topic summarization system 604 ranks the scored segments and selects the highest-score segments that fit within a context window of a large language model. A prompt to a large language model is created using the selected segments of the RFP. The large language model generates a response that includes a topic summarization of the RFP 610. The web service returns the topic summarization to the client device 606.

The tags in the topic summarization are predefined and match with the topics that were defined in the instruction in the prompt. The prompt to the large language model includes instruction on the required summary result, the main topics to focus on, and the required structure for an output. The set of tags are included in those instructions. Each tag is associated/specified by a matching question w/o instruction on the extent of details to include in the answer/resulted summary. For example, in the sales domain and specifically in the RFP related domain, the key topics are: (1) the identity of the procuring entity; (2) the procured item (requested product or service); (3) the deadlines and timelines; (4) contact details; and (5) budget for the project.

Figure 7:
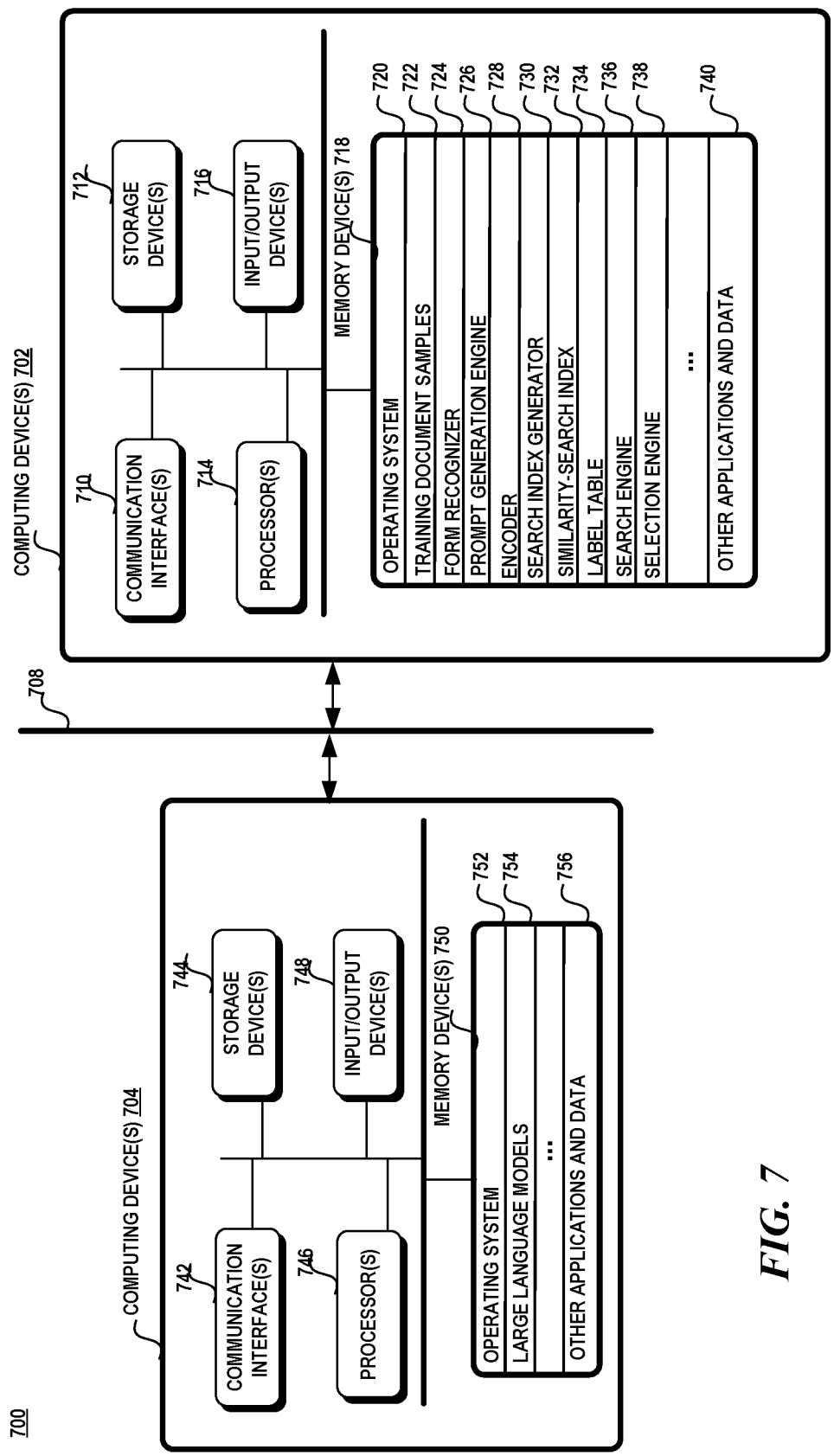
FIG. 7 is a block diagram illustrating an exemplary operating environment.

Attention now turns to a discussion of a second exemplary operating environment 700. FIG. 7 illustrates an exemplary operating environment 700 having one or more computing devices 702, 704 communicatively coupled to a network 706. In one aspect, the generation of the similarity-search index and the summarization processing may be processed on one computing device 702 and the large language model may be hosted as a service on a second computing device 704. In another aspect, the large language models may be hosted in the same web service that produces the topic summarization. The aspects of the operating environment are not constrained to a particular configuration.

The computing devices 702, 704 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 500 may be configured in a network environment, a distributed environment, a multi-processor environment, or a stand-alone computing device having access to remote or local storage devices.

A computing device 702, 704 may include one or more processors 714, 746, one or more communication interfaces 710, 742, one or more storage devices 712, 744, one or more input/output devices 716, 748, and one or more memory devices 718, 750. A processor 714, 746 may be any commercially available or customized processor and may include dual microprocessors and multi-processor architectures. A communication interface 710, 742, facilitates wired or wireless communications between the computing device 702, 704 and other devices. A storage device 712, 744 may be computer-readable medium that does not contain propagating signals, such as modulated data signals transmitted through a carrier wave. Examples of a storage device 712, 744 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 712, 744, in a computing device 702, 704. The input/output devices 716, 748 may include a keyboard, mouse, pen, voice input device, touch input device, display, speakers, printers, etc., and any combination thereof.

A memory device 718, 750 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 718, 750 may also include one or more external storage devices or remotely located storage devices that do not pertain to propagated signals, such as modulated data signals transmitted through a carrier wave.

The memory device 718, 750 may contain instructions, components, and data. A component is a software program that performs a specific function and is otherwise known as a module, program, component, and/or application. The memory device 718 may include an operating system 720, training document samples 722, form recognizer 724, prompt generation engine 726, encoder 728, search index generator 730, similarity-search index 732, label table 734, search engine 736, selection engine 738, and other applications and data 740. Memory device 750 may include an operating system 752, one or more large language models 754, and other applications and data 756.

The computing devices 702, 704 may be communicatively coupled via a network 706. The network 706 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 706 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed pertain to the technical problem of generating a topic summarization of a long document. A topic summarization is a shortened version of the long document that describes the topics of interest. The technical features associated with addressing this problem is the search for the segments of the long document that pertain to the topics of interest. The search is performed using a similarity-search index which groups similar segments together based on similar segment embeddings. The segments that contain data that pertains to the topics of interest are selected from the long document and provided to a large language model to generate the topic summarization. A technical effect achieved is the reduction of the number of prompts that a user makes to obtain a topic summarization thereby reducing the computational resources used by the computing device. A technical effect achieved is use of the similarity-search index that finds the labels of semantically-similar segments without performing a brute force search thereby reducing the computational resources used by the computing device.

CONCLUSION

The techniques described herein are an improvement over prior solutions that utilize multiple prompts to send a long document to a large language model for the large language model to generate a topic summarization of the long document. This prior solution results in significant latency in generating the topic summarization through multiple prompts and incurs considerable computing resources and cost. Other prior solutions truncate the large document and only send the first part of the long document to the large language model thereby missing important details from the truncated portion.

The technique described herein is advantageous over the prior solutions by minimizing the computational overhead incurred by the computing device in the generation of the topic summarization by providing the most important segments of the long document in a single prompt. The identification of the most important segments is based on the semantic similarity between the training data and the target document, through the use of the segment embeddings, and the search-similarity index that is created for a particular type of document.

One of ordinary skill in the art understands that the techniques disclosed herein are inherently digital. The operations used to generate the similarity-search index, to search for similar segments, to select the most important segments of the long document, to generate the prompt with the selected segments, and the use of the large language model to predict a topic summarization are inherently digital. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments and in testing labs for production environments as opposed to being mere thought experiments. Hence, the human mind cannot perform the operations described herein in a timely manner and with the accuracy required for these intended uses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

A system is disclosed for generating a topic summarization of a long document, comprising: a processor; and a memory that stores a program that is configured to be executed by the processor, the program includes instructions to perform actions that: extract a plurality of target segments from the long document, wherein size of the long document exceeds size of a context window of a large language model; obtain at least one topic of interest for the long document; access sample segments from a plurality of sample documents, wherein each sample segment is associated with at least one label, the at least one label contains a value that represents whether the sample segment is associated with the at least one topic of interest; search for k sample segments from the plurality of sample documents closely-matching each target segment of the plurality of target segments; compute a score for each target segment from the long document, wherein the score is based on an average of the labels associated with the k sample segments from the plurality of sample documents closely-matching a respective target segment; select ones of the plurality of target segments from the long document having highest scores; and obtain the topic summarization of the long document from the large language model given the select ones of the plurality of target segments.

In an aspect, the system includes instructions to perform actions that: generate an embedding for each sample segment; and create a similarity-search index for the sample segments, wherein the similarity-search index comprises a plurality of clusters, wherein a cluster comprises similar sample segment embeddings. In an aspect, the search for k sample segments closely-matching each target segment of the plurality of target segments includes instructions to perform actions that: search the similarity-search index for k closely-matching embeddings to an embedding of each target segment.

In an aspect, the similarity-search index pertains to a particular type of long document. In an aspect, the program includes instructions to perform actions that: craft a prompt to the large language model for the large language model to generate the topic summarization, wherein the prompt comprises the selected ones of the plurality of target segments from the long document having highest scores.

In an aspect, the system includes instructions to perform actions that: craft a prompt to the large language model for the large language model to generate the label for each sample segment given the sample segment and the at least one topic of interest; and obtain the labels for each sample segment from the large language model given the prompt. In an aspect, the long document comprises a Request For Proposal, a contract, a technical specification, or manual. In an aspect, the large language model is a neural transformer model with attention.

A computer-implemented method for generating a topic summarization for a long document is disclosed, comprising: obtaining a plurality of target segments of a long document and a topic of interest for the long document; accessing a similarity-search index comprising a plurality of embeddings, each embedding associated with a sample segment and a label, wherein the label contains a value indicating whether the sample segment relates to the topic of interest; generating an embedding for each target segment of the plurality of target segments; searching the similarity-search index for k closest-matching embeddings of the plurality of embeddings for each embedding of each target segment of the long document; computing a score for each target segment of the plurality of target segments from the long document based on labels of the k closest-matching embeddings; selecting ones of the plurality of target segments from the long document having a highest score; and generating the topic summary of the long document from the large language model given the selected target segments of the long document.

In an aspect, the similarity-search index pertains to a particular type of long document. In an aspect, the score for each target segment of the plurality of target segments from the long document is an average of the sum of the labels associated with the k closest-matching embeddings. In an aspect, the computer-implemented method, further comprises: crafting a prompt to the large language model, wherein the prompt comprises the selected target segments from the long document having highest scores.

In an aspect, the large language model is a neural transformer model with attention. In an aspect, the long document comprises a legal contract, a Request For Proposal document, or technical specification.

A hardware storage device is disclosed having stored thereon computer executable instructions that are structured to be executable by a processor of a computing device to thereby cause the computing device to perform actions that: obtain a plurality of target segments of a long document and a topic of interest for the long document; access a similarity-search index comprising a plurality of embeddings, each embedding associated with a sample segment and a label, wherein the label contains a value indicating whether the sample segment relates to the topic of interest; generate an embedding for each target segment of the plurality of target segments; search the similarity-search index for k closest-matching embeddings of the plurality of embeddings for each embedding of each target segment of the long document; score each target segment of the plurality of target segments from the long document based on labels of the k closest-matching embeddings; select ones of the plurality of target segments from the long document having a highest score; and generate the topic summary of the long document from the large language model given the selected ones of the plurality of target segments of the long document.

In an aspect, the similarity-search index pertains to a particular type of long document. In an aspect, the score for each segment of the plurality of segments from the long document is an average of the sum of the labels associated with the k closest-matching embeddings. In an aspect, the hardware storage device has stored thereon computer executable instructions that are structured to be executable by a processor of a computing device to thereby cause the computing device to perform actions that: generate a prompt to the large language model comprising the selected target segments from the long document having highest scores. In an aspect, the large language model is a neural transformer model with attention.

What is claimed:

1. A system for generating a topic summarization of a long document, comprising:
 a processor; and
 a memory that stores a program that is configured to be executed by the processor, the program includes instructions to perform actions that:

extract a plurality of target segments from the long document, wherein size of the long document exceeds size of a context window of a large language model;
obtain at least one topic of interest for the long document;
access sample segments from a plurality of sample documents, wherein each sample segment is associated with at least one label, the at least one label contains a value that represents whether the sample segment is associated with the at least one topic of interest;
search for k sample segments from the plurality of sample documents closely-matching each target segment of the plurality of target segments;
compute a score for each target segment from the long document, wherein the score is based on an average of the labels associated with the k sample segments from the plurality of sample documents closely-matching a respective target segment;
select ones of the plurality of target segments from the long document having highest scores; and
obtain the topic summarization of the long document from the large language model given the select ones of the plurality of target segments.

2. The system of claim 1, wherein the program includes instructions to perform actions that:
generate an embedding for each sample segment; and
create a similarity-search index for the sample segments, wherein the similarity-search index comprises a plurality of clusters, wherein a cluster comprises similar sample segment embeddings.

3. The system of claim 2, wherein search for k sample segments closely-matching each target segment of the plurality of target segments includes instructions to perform actions that:
search the similarity-search index for k closely-matching embeddings to an embedding of each target segment.

4. The system of claim 2, wherein the similarity-search index pertains to a particular type of long document.

5. The system of claim 1, wherein the program includes instructions to perform actions that:
craft a prompt to the large language model for the large language model to generate the topic summarization, wherein the prompt comprises the selected ones of the plurality of target segments from the long document having highest scores.

6. The system of claim 1, wherein the program includes instructions to perform actions that:
craft a prompt to the large language model for the large language model to generate the label for each sample segment given the sample segment and the at least one topic of interest; and
obtain the labels for each sample segment from the large language model given the prompt.

7. The system of claim 1, wherein the long document comprises a Request For Proposal, a contract, a technical specification, or manual.

8. The system of claim 1, wherein the large language model is a neural transformer model with attention.

9. A computer-implemented method for generating a topic summarization for a long document, comprising:
obtaining a plurality of target segments of a long document and a topic of interest for the long document;
accessing a similarity-search index comprising a plurality of embeddings, each embedding associated with a sample segment and a label, wherein the label contains a value indicating whether the sample segment relates to the topic of interest;
generating an embedding for each target segment of the plurality of target segments;
searching the similarity-search index for k closest-matching embeddings of the plurality of embeddings for each embedding of each target segment of the long document;
computing a score for each target segment of the plurality of target segments from the long document based on labels of the k closest-matching embeddings;
selecting ones of the plurality of target segments from the long document having a highest score; and
generating the topic summary of the long document from the large language model given the selected target segments of the long document.

10. The computer-implemented method of claim 9, wherein the similarity-search index pertains to a particular type of long document.

11. The computer-implemented method of claim 9, wherein the score for each target segment of the plurality of target segments from the long document is an average of the sum of the labels associated with the k closest-matching embeddings.

12. The computer-implemented method of claim 9, further comprising:
crafting a prompt to the large language model for the large language model to generate the topic summary, wherein the prompt comprises the selected target segments from the long document having highest scores.

13. The computer-implemented method of claim 9, wherein the large language model is a neural transformer model with attention.

14. The computer-implemented method of claim 9, wherein the long document comprises a legal contract, a Request For Proposal document, or technical specification.

15. The computer-implemented method of claim 9, further comprising:
craft a prompt to the large language model for the large language model to generate the label for each sample segment given the sample segment and the topic of interest; and
obtain the labels for each sample segment from the large language model given the prompt.

16. A hardware storage device having stored thereon computer executable instructions that are structured to be executable by a processor of a computing device to thereby cause the computing device to perform actions that:
obtain a plurality of target segments of a long document and a topic of interest for the long document;
access a similarity-search index comprising a plurality of embeddings, each embedding associated with a sample segment and a label, wherein the label contains a value indicating whether the sample segment relates to the topic of interest;
generate an embedding for each target segment of the plurality of target segments;
search the similarity-search index for k closest-matching embeddings of the plurality of embeddings for each embedding of each target segment of the long document;
score each target segment of the plurality of target segments from the long document based on labels of the k closest-matching embeddings;
select ones of the plurality of target segments from the long document having a highest score; and
generate the topic summary of the long document from the large language model given the selected ones of the plurality of target segments of the long document.

17. The hardware storage device of claim 16, wherein the similarity-search index pertains to a particular type of long document.

18. The hardware storage device of claim 16, wherein the score for each segment of the plurality of segments from the long document is an average of the sum of the labels associated with the k closest-matching embeddings.

19. The hardware storage device of claim 16, having stored thereon computer executable instructions that are structured to be executable by a processor of a computing device to thereby cause the computing device to perform actions that:
   generate a prompt to the large language model comprising the selected target segments from the long document having highest scores.

20. The hardware device of claim 16, wherein the large language model is a neural transformer model with attention.

* * * * *